United States Patent [19]

Heinz

[11] Patent Number: 4,497,005
[45] Date of Patent: Jan. 29, 1985

[54] MULTIPLE MAGNETIC TRANSDUCER HEAD, PARTICULARLY FOR USE WITH MULTI-TRACK VIDEO TAPE RECORDING APPARATUS

[75] Inventor: Richard Heinz, Pfungstadt, Fed. Rep. of Germany

[73] Assignee: Robert Bosch GmbH, Stuttgart, Fed. Rep. of Germany

[21] Appl. No.: 379,635

[22] Filed: May 19, 1982

[30] Foreign Application Priority Data

Jun. 2, 1981 [DE] Fed. Rep. of Germany ....... 3121791

[51] Int. Cl.³ .......................... G11B 21/24; G11B 5/56
[52] U.S. Cl. ...................................... 360/109
[58] Field of Search ......................... 360/109

[56] References Cited

U.S. PATENT DOCUMENTS 4,117,522  9/1978  Whittle et al. ...................... 360/109
4,314,296  2/1982  Whittle .............................. 360/109
4,318,146  3/1982  Ike et al. ............................ 360/107

Primary Examiner—Robert S. Tupper
Attorney, Agent, or Firm—Frishauf, Holtz, Goodman & Woodward

[57] ABSTRACT

Individual adjustability of multiple transducer heads (2, 4) with respect to each other is provided by mounting the transducer heads on a plate-like support (1) of non-metallic resilient material, such as bronze or brass, and cutting a slit (4) between the transducer heads. By passing screws 11, 12 through the strips behind the transducer heads, the strips can be bent, for example by bending about a hinge crease 13, and thereby adjust the relative height position of the transducer heads 2, 3, with respect to each other, and thus the tracking position of the transducer heads with respect to multiple tracks on a magnetic tape. The arrangement is particularly suitable for mounting on a support plate 20 of a head wheel of a rotating transducer head for use in video recording.

10 Claims, 1 Drawing Figure

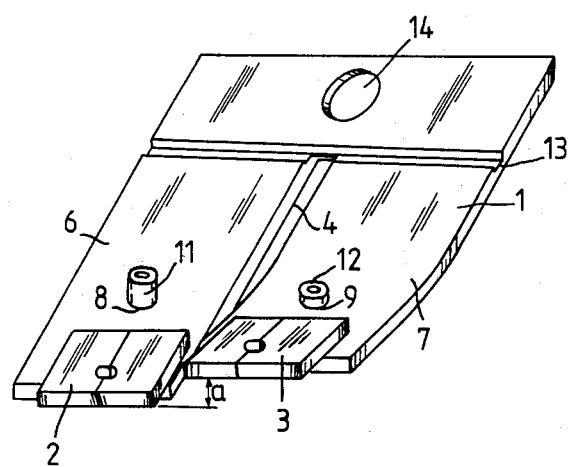

MULTIPLE MAGNETIC TRANSDUCER HEAD, PARTICULARLY FOR USE WITH MULTI-TRACK VIDEO TAPE RECORDING APPARATUS

Cross reference to related U.S. Pat. No. 4,318,146 (Ike et al.), the disclosure of which is hereby incorporated by reference.

The present invention relates to a magnetic tape transducer head, and more particularly to a magnetic tape transducer head for use in the video tape recording field for transducing multiple parallel tracks.

BACKGROUND

Multiple-tape transducer heads in the video tape recording field are frequently retained on the circumference of a head wheel. One multiple magnetic head transducer arrangement is described in German Patent Publication Document DE-OS 29 52 627. Three magnetic tape transducer heads are positioned on a single head carrier support plate. After positioning these three heads, it is practically impossible to effect adjustment of the heads after initial placement thereof.

THE INVENTION

It is an object to provide a magnetic transducer head arrangement in which multiple transducer heads can be secured, together, on a support, typically a support plate of a rotating head wheel, and which permits individual adjustment of the magnetic transducer heads with respect to each other, so that the relationship of the transducer heads with respect to scanning tracks can be accurately controlled.

Briefly, a common plate-like carrier is secured to the base support, for example a support plate or element of a rotating head wheel. The common plate-like carrier is made of non-magnetic elastic material, the magnetic heads being secured, side-by-side, to an end portion opposite the end of the plate-like element which is secured to the support. An elongated slit is located between the magnetic heads and extends from the end portion of the non-magnetic plate towards its support region. Adjustment means, such as screws passing through the resilient plate and bearing against the support then are provided to specifically locate the heads with respect to the support, such as the head wheel carrier, and consequently also with respect to each other.

The arrangement has the advantage that a plurality of transducer heads, for example two, can be commonly mounted on the base support, such as a head wheel carrier plate, without, however, detracting from individual adjustability of the tracking position of the respective heads. Simultaneously, errors in centricity can be compensated.

DRAWING

The single FIGURE is a perspective top view of the magnetic transducer head arrangement.

A carrier plate 1, made of elastic non-magnetic material, such as brass or bronze, for example, has two transducer heads 2, 3 located thereon. The carrier 1 is slit in the middle by a slit 4, thereby forming two separate support strips 6, 7 for the transducer 2, 3. A tapped bore 8, 9 is located behind the magnetic heads 2 through which corresponding adjustment screws 11, 12 are threaded.

The plate 1 is formed with an additional attachment hole 14 to attach the plate 1 on a base support, for example a head wheel carrier plate 20 of a rotating transducer head wheel. Between the opening 14 and preferably close to or at the terminal end of the slit 4, plate 1 is formed with a transversely extending groove forming a predetermined hinge location or forming a hinge crease.

Adjustment of the heads: Upon threading screws 11, 12 to bear against the upper surface of support plate 20, the relative height position of the heads 2, 3 can be adjusted, so that the track distance a between adjacent tracks can be accurately controlled.

I claim:

1. Multiple magnetic transducer head arrangement, particularly for use with multiple track magnetic tape apparatus, having
    a plurality of magnetic transducer heads (2,3), said transducer heads being relatively adjustable with respect to each other, said transducer head arrangement being adapted for assembly on a magnetic transducer head support (20),
    and comprising, in accordance with the invention,
    a common plate-like carrier (1) for the magnetic heads (2,3) having a first end portion secured to said support (20), said common carrier being made of non-magnetic elastic material, the magnetic heads (2,3) being secured side-by-side to a second end portion of said plate-like carrier (1), opposite said first end portion, and separated therefrom by a transversely extending hinge crease (13);
    an elongated slit (4) located between the magnetic heads and extending towards the first end portion up to said hinge crease to thereby form respective transducer head support strips (6,7);
    and adjustment means (8,9,11,12) located behind the respective magnetic heads for adjustably spacing the respective support strips (6, 7) with respect to the support (20), and spacing the magnetic heads (2,3) with respect to each other by a distance "a" corresponding to a desired distance between adjacent magnetic tracks,
    said adjustment means comprising tapped bores (8,9) formed in the strips (6, 7) and positioned behind the transducer heads on the strips close to the transducer heads; and screws (11,12) passing through said tapped bores (8,9) and bearing against the support (20) to space the transducer heads (2,3), individually, by deflection of said strips from said support.

2. Transducer head arrangement according to claim 1, wherein said plate (1) is formed with an attachment hole (14), in said first end portion, adapted for attaching the plate (1) to a head wheel carrier plate (20) of a rotating transducer head wheel.

3. Transducer head arrangement according to claim 1, wherein said non-magnetic carrier material (1) comprises brass.

4. Transducer head arrangement according to claim 1, wherein said non-magnetic carrier material (1) comprises bronze.

5. Transducer head arrangement according to claim 1, wherein said transversely extending hinge crease (13) comprises a groove formed in said carrier plate (1) near the terminal end of said slit (4).

6. In combination with a rotary magnetic head assembly having a tape guide and a rotating head wheel,
    a planar head support plate (20) secured to said head wheel, a multiple magnetic transducer head arrangement comprising:

a common plate-like carrier (1) for the magnetic heads (2,3) having a first end portion secured to said support (20), said common carrier being made of non-magnetic elastic material, the magnetic heads (2,3) being secured side-by-side to a second end portion of said plate-like carrier (1), opposite said first end portion, and separated therefrom by a transversely extending hinge crease (13);

an elongated slit (4) located between the magnetic heads and extending towards the first end portion up to said hinge crease to thereby form respective transducer head support strips (6,7);

and adjustment means (8,9,11,12) located behind the respective magnetic heads for adjustably spacing the respective support strips (6, 7) with respect to the support (20), and spacing the magnetic heads (2,3) with respect to each other by a distance "a" corresponding to a desired distance between adjacent magnetic tracks, said adjustment means comprising tapped bores (8,9) formed in the strips (6, 7) and positioned behind the transducer heads on the strips close to the transducer heads; and screws (11,12) passing through said tapped bores (8,9) and bearing against the support (20) to space the transducer heads (2,3), individually, by deflection of said strips from said support.

7. A combination according to claim 6, wherein said plate (1) is formed with an attachment hole (14), in said first end portion, adapted for attaching the plate (1) to a head wheel carrier plate (20) of a rotating transducer head wheel.

8. A combination according to claim 6, wherein said non-magnetic carrier material (1) comprises brass.

9. A combination according to claim 6, wherein said non-magnetic carrier material (1) comprises bronze.

10. A combination according to claim 6, wherein said transversely extending hinge crease (13) comprises a groove formed in said carrier plate (1) near the terminal end of said slit (4).

* * * * *